United States Patent [19]

Fresia

[11] Patent Number: 4,823,236
[45] Date of Patent: Apr. 18, 1989

[54] HIGH TEMPERATURE ALUMINUM ELECTROLYTIC CAPACITOR

[75] Inventor: E. James Fresia, Williamstown, Mass.

[73] Assignee: Sprague Electric Company, North Adams, Mass.

[21] Appl. No.: 201,000

[22] Filed: May 23, 1988

[51] Int. Cl.⁴ .............................................. H01G 9/02
[52] U.S. Cl. ................................... 361/506; 252/62.2
[58] Field of Search ................... 252/62.2; 361/433 E, 361/314, 315

[56] References Cited

U.S. PATENT DOCUMENTS 4,373,176 2/1983 Finkelstein et al. ................ 361/433
4,454,567 6/1984 Ross et al. ...................... 252/62.2 X
4,509,094 4/1985 Finkelstein et al. ................ 361/314
4,734,821 3/1988 Morimoto et al. .................. 361/433

FOREIGN PATENT DOCUMENTS 2005918 4/1979 United Kingdom .

Primary Examiner—Donald A. Griffin

[57] ABSTRACT

A capacitor having a wound aluminum foil electrolytic capacitor section contains an electrolyte solution of 10 to 32 wt % diethylammonium fumarate, 10 to 30 wt % N-methylpyrrolidinone, 4 to 7 wt % water, 0.1 to 0.5 wt % ammonium dihydrogen phosphate, with the remainder ethylene glycol. The capacitor is capable of operation at temperatures up to 125° C.

3 Claims, 1 Drawing Sheet

HIGH TEMPERATURE ALUMINUM ELECTROLYTIC CAPACITOR

BACKGROUND OF THE INVENTION

This invention relates to a high temperature aluminum electrolytic capacitor, and more particularly to such a capacitor which utilizes an electrolyte comprising a mixed solvent system of N-methylpyrrolidinone and ethylene glycol plus a mixed solute system of diethylammonium fumarate to provide a capacitor capable of operation at 125° C.

Prior art electrolytes that are based predominantly on ethylene glycol have proven extremely useful at temperatures up to about 95° C., more generally 85° C. For temperatures above 85° C., the solvent of choice has been dimethylformamide (DMF) usually. Some electrolytes now in use at 125° C. contain solvent mixtures of ethylene glycol and DMF.

However the interest in the replacement of DMF has become more popular due to: (1) potential toxicity problems, which require stringent handling procedures; (2) difficulty in disposal of capacitors containing the solvent; and (3) low flash point, which creates a flammability problem.

It is an object of this invention to provide aluminum electrolytic capacitors capable of operating at 125° C. with the above-identified problems minimized or eliminated. Another object is to provide a solution to those prior art problems which involve choices in electrolyte composition and material selection.

SUMMARY OF THE INVENTION

In accordance with this invention, a wound-foil aluminum electrolytic capacitor contains an electrolyte solution of 10 to 32 wt% diethylammonium fumarate, 4 to 7 wt% water, 0.1 to 0.5 wt% ammonium dihydrogen phosphate, 10 to 30 wt% N-methylpyrrolidinone, and up to 60 wt% ethylene glycol. This electrolyte has a room temperature resistivity of 300 to 400 ohm-cm and is useful in capacitors rated up to 200 v at above 85° C., and specifically as high as 125° C.

Ammonium dihydrogen phosphate is provided to ensure capacitor stability by maintaining the passivity of the cathode foil so it will not react with water and produce hydrogen gas.

The performance of the electrolyte of this invention at 125° C. is improved by use of compositions yielding 125° C. resistivity of 300–400 ohm-cm. Below this resistivity the use temperature of the capacitor should be restricted to 150° C. on units rated at 50 v or higher.

DESCRIPTION OF THE PREFERRED EMBODIMENTS

Figure 1:
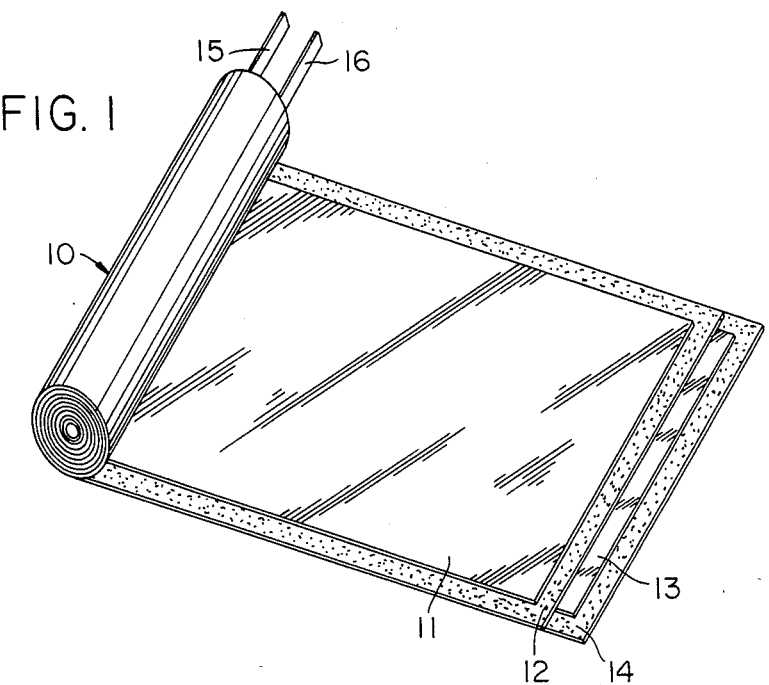
FIG. 1 shows a wound-foil capacitor section partially unrolled.

FIG. 1 shows an electrolytic capacitor having a convolutely wound capacitor section 10 with an aluminum anode foil 11 contiguously wound with an aluminum cathode foil 13 and interleaved spacer material 12 and 14. Anode foil 11 bears a barrier layer dielectric oxide on its surface; cathode foil 13 may also bear such an oxide. Electrode tabs 15 and 16 are connected to anode foil 11 and cathode foil 13, respectively. Tabs 15 and 16 may extend from the same end of section 10, as shown in FIG. 1; or one tab from each end of the section, as shown in FIG. 2.

Figure 2:
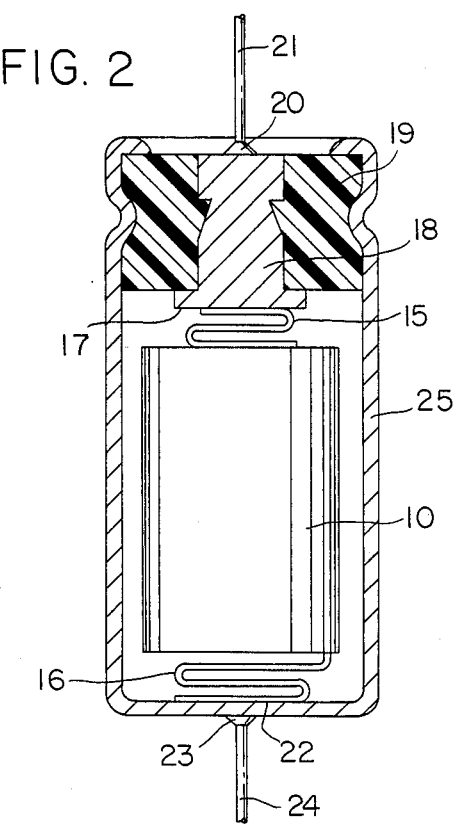
FIG. 2 is a cross-sectional view of a complete capacitor containing the electrolyte of the present invention.

FIG. 2 shows a cross-section of a capacitor in which section 10 is located in metal container 25, preferably an aluminum can. Electrode tab 16 connects cathode 13 to the inside bottom of container 25 at 22, preferably via a weld. Tab 15 likewise connects anode 11 to the bottom of a metal terminal insert 18 at 17, again preferably via a weld. Insert 18 passes through an insulating closure or bung 19. External anode lead 21 is connected at 20, preferably a weld, to the top of insert 18. External cathode lead 24 is similarly connected at 23 to the outside of container 25. Section 10 is impregnated with the electrolyte of the present invention.

The electrolyte of this invention consists essentially of a solution of 10 to 32 wt% diethylammonium fumarate, 4 to 7 wt% water, 0.1 to 0.5 wt% ammonium dihydrogen phosphate, 10 to 30 wt% N-methylpyrrolidinone (NMP), and the balance ethylene glycol.

It is desirable that the solute, in this case diethylammonium fumarate, be stable at elevated temperatures of at least 125° C. in order that the resistivity of the electrolyte does not increase on long term exposure.

Resistivity increase can be due to formation of the amide when the solute is an ammonium or subsituted ammonium salt of a monobasic or dibasic carboxylic acid. Amide formation is easiest with the ammonium salts and decreases with increasing substitution in the amine. Thus, the diethylammonium salt has been used in this invention to retard the amide formation.

An advantage of the fumarate is that it is the trans isomer which remains stable on heating; thus, no change in the structure occurs to cause changes in the chemical composition which could result in resistivity changes.

The use of the NMP offers an increase in the boiling point of the electrolyte and a reduction in the flammability when compared with the previously used DMF. The boiling point of the NMP is 202° C., compared with 153° C. for the DMF. The flash point of the NMP is 95° C. vs 67° C. for DMF.

EXAMPLE 1

Table 1 below gives the composition in weight percent for two electrolytes, (A) representing the lower end and (B) upper end of the desired resistivity range for this system. Also included is the resistivity in ohm-cm, the maximum anodization voltage ($V_{max}$) in volts measured on plain aluminum foil, and the scintillation voltage ($V_{sc}$). This latter value $V_{sc}$ is determined by applying a constant current of 1 ma/cm$^2$ to an aluminum foil tab which has been preanodized to 600 v. This value $V_{sc}$ yields the voltage stress which the electrolyte is capable of withstanding.

TABLE 1

| Electrolyte | A | B |
| --- | --- | --- |
| Ethylene Glycol | 58.1 | 59.4 |
| N—methylpyrrolidinone | 12.2 | 21.8 |
| Diethylammonium fumarate | 22.7 | 11.8 |
| Water | 6.5 | 6.5 |
| Ammonium dihydrogen phosphate | 0.5 | 0.5 |
| Resistivity | 304 | 386 |
| $V_{max}$ at 125° C. | 210 | 191 |
| $V_{sc}$ at 125° C. | 150 | 450 |

EXAMPLE 2

In this example the two NMP electrolytes A and B from Example 1 were used in the manufacture of 10 μf aluminum foil capacitors. A control electrolyte in which DMF was one of the solvents in place of NMP was also used. The capacitors were subjected to 2000 hours of life test at 105° C. with 50 v bias applied. The results are given in Table 2.

TABLE 2

| Electrolyte | | Control | A | B |
| --- | --- | --- | --- | --- |
| Cap (μf) | Initial | 10.2 | 10.3 | 10.1 |
| | Final | 9.8 | 10.2 | 9.89 |
| % DF | Initial | 5.30 | 5.12 | 5.92 |
| | Final | 5.25 | 5.96 | 6.11 |
| DCL (μa) | Initial | 2.24 | 0.29 | 0.20 |
| | Final | 0.057 | 0.074 | 0.064 |
| Failures | | 1/15 | 0/15 | 1/15 |

It can be seen from Table 2 that capacitors made with all three electrolytes perform extremely well at 105° C.

EXAMPLE 3

The same three electrolytes used in Example 2 were also used in this example to manufacture 10 μf aluminum foil electrolytic capacitors. These parts were subjected to 2000 hours of life test at 125° C. with 35 v bias applied. The results are summarized in Table 3.

TABLE 3

| Electrolyte | | Control | A | B |
| --- | --- | --- | --- | --- |
| Cap (μf) | Initial | 10.2 | 10.2 | 10.1 |
| | Final | 8.22 | 8.4 | 8.33 |
| % DF | Initial | 4.73 | 4.87 | 5.44 |
| | Final | 6.67 | 6.16 | 7.04 |
| DCL (μa) | Initial | 0.12 | 0.24 | 0.14 |
| | Final | 0.041 | 0.049 | 0.042 |
| Failures | | 0/15 | 8/15 | 0/15 |

From these data it is obvious that the higher resistivity electrolyte B performed extremely well at 125° C. and can be considered to be an adequate substitute for the DMF-containing control electrolyte.

What is claimed is:

1. A high temperature aluminum electrolytic capacitor comprises a wound-foil capacitor section containing an electrolyte solution having a room temperature resistivity range of 300 to 400 ohm-cm, said solution comprising 10 to 32 wt% diethylammonium fumarate, 4 to 7 wt% water, 0.1 to 0.5 wt% ammonium dihydrogen phosphate, 10 to 30 wt% N-methylpyrrolidinone, and up to 60 wt% ethylene glycol.

2. The capacitor of claim 1 wherein said solution has a resistivity at the upper end of said range, and said solution comprises about 22 wt% N-methylpyrrolidinone and about 12 wt% diethylammonium fumarate.

3. The capacitor of claim 1 wherein said solution has a resistivity at the lower end of said range, and said solution comprises about 12 wt% N-methylpyrrolidinone and about 23 wt% diethylammonium fumarate.

* * * * *